E. W. SKINNER.
Chain-Link.

No. 216,355. Patented June 10, 1879.

Witnesses:
W. B. Masson
W. C. Bowen

Inventor:
Elisha W. Skinner
by E. E. Masson
atty.

UNITED STATES PATENT OFFICE.

ELISHA W. SKINNER, OF SIOUX CITY, IOWA.

IMPROVEMENT IN CHAIN-LINKS.

Specification forming part of Letters Patent No. 216,355, dated June 10, 1879; application filed April 28, 1879.

*To all whom it may concern:*

Be it known that I, ELISHA W. SKINNER, of Sioux City, in the county of Woodbury and State of Iowa, have invented certain new and useful Improvements in Chain-Links; and I hereby declare that the following is a full, clear, and exact description of the same, reference being had to the accompanying drawings, making a part of this specification, in which—

Figure 1:
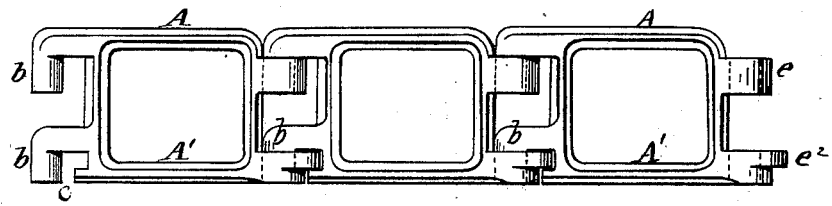
Figure 2:
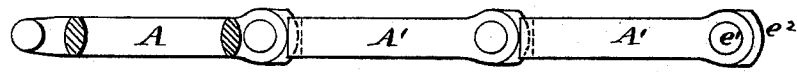
Figure 3:
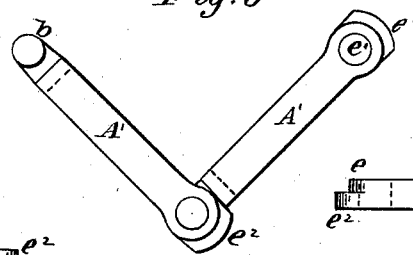
Figure 5:
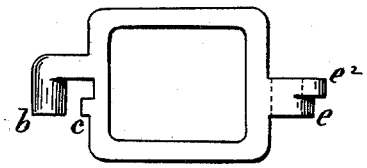
Figure 6:
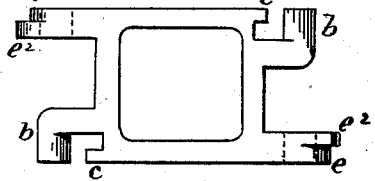
Figure 4:
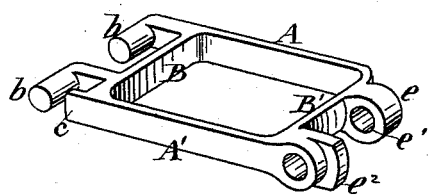

Figure 1 represents part of a chain embodying my invention. Fig. 2 represents a side view of the same, with one of the links in section. Fig. 3 represents, in side view, two of the links in position to be united or disconnected. Fig. 4 represents one of the links in perspective. Figs. 5 and 6 represent modifications of the same.

This invention relates to that class of sprocket-wheel chains in which the links are constructed in such a manner as to permit the removal or insertion of one or more links in the chain.

Heretofore the links of this class of chains have generally been made with a hook at one end and a transverse bar at the other for engagement with the hook of the adjoining link, and of such form as to be considered as finished on leaving the mold, and thus produce them at a very low cost. One of the defects of these links is that the parts uniting one link to the next are generally so rough as to impinge upon each other, and thus destroy the flexibility that a chain should have to embrace pulleys of small diameter.

The object of my invention is to produce a chain having such flexibility that it can be used on sprocket-wheels of small diameter, and in which the links can be readily disconnected by hand. Flexibility is obtained by drilling, in contradistinction to casting, the journal-bearings of one of the parts forming the hinge of each link, producing a smooth surface, against which even a rough surface will not be an objectionable feature. Security and durability are obtained by the peculiar form of said hinge.

My invention consists in a rectangular link provided with one or more cylindrical pintles and a locking-projection at one end and one or more eyes carrying a semi-rectangular lug or locking-projection at the other, the two stated projections being made interlocking in their normal position when two links are brought together, and capable of separating when one link is brought at right angle, or nearly so, to the one adjoining it, as will be described hereinafter.

In the drawings, A and A' represent the two sides of the link, and B and B' the two ends of said link. The sides are shown as parallel, a rectangular link being generally required for sprocket-wheels; but they may form an angle if a trapezoid-link should be required. The ends B B' are also parallel.

In the first four figures the end B is shown as provided with pintles $b$, projecting at a short distance and parallel to this end, and also with a rectangular locking-projection, $c$, formed on the end B, either by indenting it or casting it thereon.

The end B' is provided with eyes $e$, having cylindrical perforations $e^1$, of such size as to readily receive pintles having a diameter equal to $b$. One of the eyes $e$ has a semicircular or semi-cylindrical lug or projection, $e^2$, to engage with the projection $c$ of an adjoining link and become interlocked therewith when in a normal position, but readily disconnected when two adjoining links are brought together, as in the position shown in Fig. 3.

In Fig. 5 the link is shown with only one pintle, $b$, at one end, and with an eye at the other, accompanied by their respective lugs $c$ and $e^2$.

In Fig. 6 the link is shown with pintles $b$ at diagonal corners, the eyes being also placed at diagonal corners, and each pintle and eye is provided with its respective lug $c$ and $e^2$.

The link shown in the first four figures is constructed with only one of its pintles and eyes provided with interlocking lugs; but it is evident that each pintle and eye may be provided with these lugs, and that the number of pintles may vary according to the width of the chain, with eyes to correspond.

Although I prefer to have these eyes drilled, to fully obtain the advantages above mentioned, they might be cored out, or partly cored, without changing the construction of the link.

Having now fully described my invention, I claim—

A rectangular link provided with one or more cylindrical pintles and locking-projection, $c$, and one or more eyes and semi-rectangular lug or locking-projection, $e^2$, substantially as and for the purpose described.

ELISHA W. SKINNER.

Witnesses:
  E. E. MASSON,
  W. B. MASSON.